Patented Apr. 22, 1947

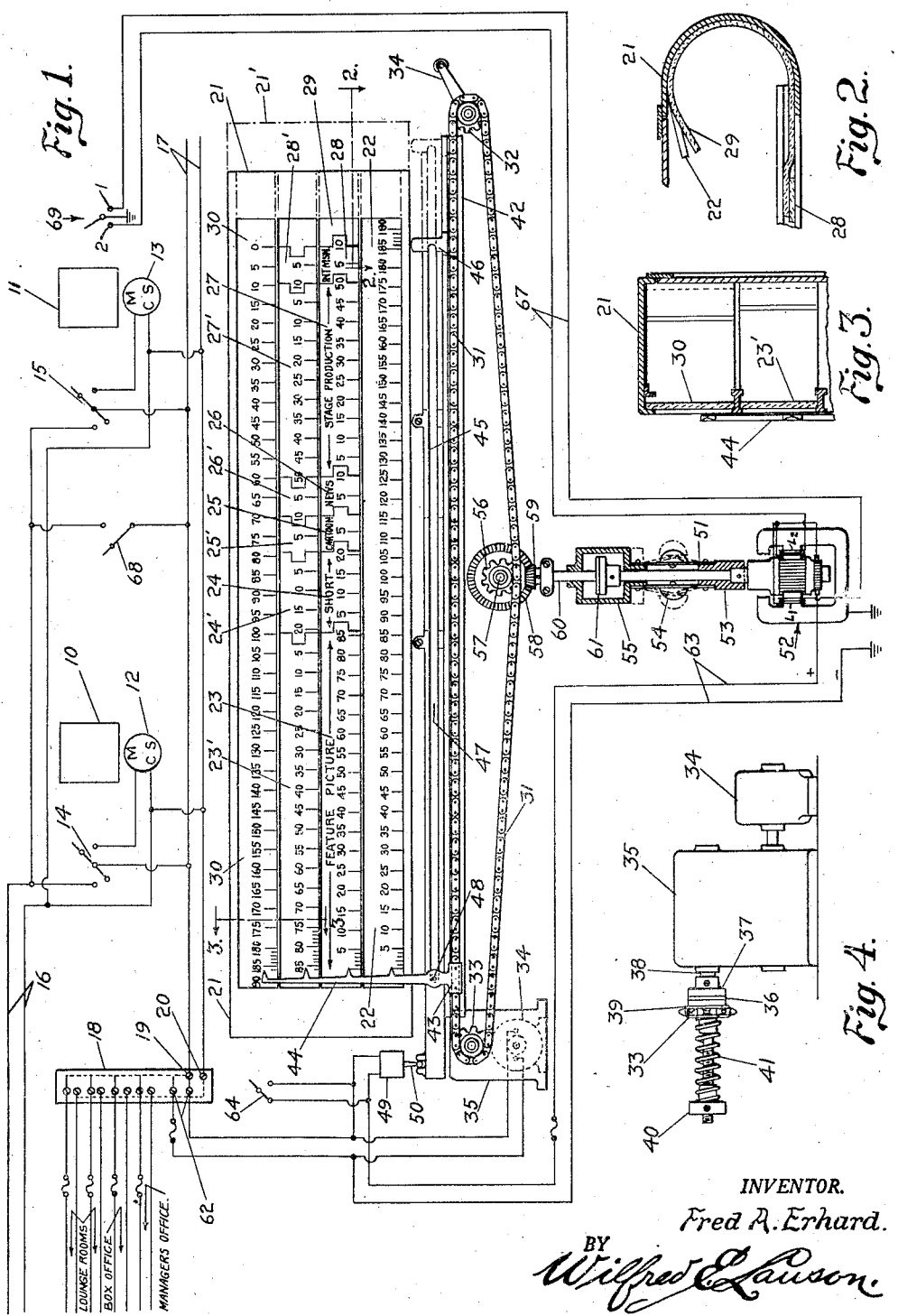

2,419,394

UNITED STATES PATENT OFFICE 2,419,394

THEATER PROGRAM SCHEDULE INDICATOR

Fred A. Erhard, El Paso, Tex.

Application February 1, 1944, Serial No. 520,703

7 Claims. (Cl. 80—16)

1

This invention relates generally to indicating devices or mechanisms and has to do particularly with a device or mechanism for use in association with entertainment programs to designate to persons outside the auditorium in which the entertainment is being given, different time features relating to the entertainment.

A particular object of the invention is to provide a theater program schedule indicator which is designed primarily for use in association with motion picture theaters but is not, of course, necessarily restricted to such use, whereby patrons of the entertainment house and others outside the auditorium in which the show is being given, can be informed of a number of different facts relating to the show such, for example, as the overall length of the show, the lengths of the different entertainment features making up the complete show, together with the length of intermission, the amount of time any particular feature has been running and the amount of time which such feature has still to run and the amount of time that the entire show has been in progress together with the time remaining for the completion of the entire show.

Another object of the invention is to provide a theater program schedule indicator for setting forth the above stated informative facts, which is designed to be operated synchronously with motion picture projectors and which is also designed to be manually set into operation and kept operating when the motion picture projectors are inoperative as, for example, during intermission periods and during such periods as stage performances may be in operation or at any other times when the picture projectors are idle.

Still another object of the invention is to provide an automatic theater program schedule indicator which is continuous in operation and which automatically resets or restarts itself at the end of each show period to repeat its operation during the running of the different features of the next succeeding show.

Still another object of the invention is to provide in apparatus of the above stated character, a novel pointer or indicator resetting mechanism by which the time designating pointer after moving for a predetermined length of time with respect to a time indicating strip will be automatically reversed and returned to the starting end of the time strip corresponding with the beginning or starting of a new show.

Other objects and advantages of the invention will become apparent as the description of the same proceeds and the invention will be best

2 understood from a consideration of the following detailed description taken in connection with the accompanying drawings forming a part of the specification, with the understanding that minor changes and modifications may be made in the invention so long as such changes and modifications mark no material departure from the salient features of the invention as expressed in the appended claims.

In the drawings:

Fig. 1 is a view in elevation of the mechanical features of the structure comprising the present invention showing the same in connection with the electric control circuits.

Fig. 2 is a fragmentary section taken substantially on the line 2—2 of Fig. 1.

Fig. 3 is a fragmentary section taken substantially on the line 3—3 of Fig. 1.

Fig. 4 is a detail view in side elevation of the endless chain driving motor and speed reduction gear mechanism.

Referring now more particularly to the drawings wherein like numerals indicate corresponding parts throughout the several views, the numerals 10 and 11 designate diagrammatically motion picture projecting machines in association with which the indicator mechanism operates, the driving motors for which machines are designated respectively 12 and 13. The control switches for these motors are designated respectively 14 and 15, such switches controlling the flow of current to the motors from the power supply line which is generally designated 16 and which is of the usual 60 cycle 110–120 volt type such as is commonly supplied for the operation of projector machines.

Only two projector machines are indicated but it is to be understood that more machines may be connected in the hook-up if desired without changing the operation of the indicator mechanism, additional projectors being connected with the indicator apparatus through the circuit lines designated 17. These lines are connected to a main control or distributer strip 18 through the terminals 19 and 20 and current is supplied to the lines 17 by the projector control switches 14 and 15 as illustrated. The positive or hot wire side of the circuit is connected to the apparatus supply lines 17 and to the main terminal strip 18 from the center of the projector motor control switches. By using a switch of this nature the feed back voltage of the motor in operation is prevented from entering the projector motor which is not in operation.

In accordance with the present invention there are provided a number of coordinated or related time indicating scales which are here illustrated as being in the form of strips or bands although it is contemplated as being within the scope of the present invention to use dials if such are found preferable. Consequently, while the term "strip" will be used in referring to the time scales it is to be understood that this term is intended to cover the use of a dial or any other type of time indicating scale which might be devised for carrying out the present invention.

The main or master program schedule indicator would be formed of any suitable size and would be located outside the theater preferably across the front of the building or upon the theater marquee and the apparatus would, of course, be housed or inclosed in a suitable housing which is generally designated 21 and through the front side of which the time indicating strips would be exposed to be seen by prospective patrons of the theater.

The numeral 22 designates the time strip which indicates the entire length of the show. Adjustably disposed above and in parallel relation with the show length indicating strip 22 is a series of time strips which are designated 23, 24, 25, 26, 27 and 28 such series of strips being arranged in progressive relation lengthwise of the show length indicating strip and here being identified as designating the time length of the feature picture, the length of a special feature, the length of a cartoon, the length of a news strip, the length of the stage show and the length of the intermission. Each of these time strips 23 to 28 inclusive shows how much time is taken for running off each subject and for the intermission and totals the length of the complete show as shown by the strip 22.

The total show length strip 22 may be designed to indicate a show running as much as 205 minutes as illustrated. This is considerably more than the usual length of a show, thus that part of the strip 22 which would not be made use of would be filled out after the intermission time indicating strip 28, by a blank strip 29.

Above the time strips which show the running of the individual subjects of the show, which time strips would be interchangeable as will be readily understood, are time strips corresponding in length to the strips 23 to 28 inclusive and designated 23', 24', 25', 26', 27' and 28', upon which the minutes of activity for each subject are set out in the reverse order from the underlying strips 23 to 28 inclusive. These time strips show, in association with the hereinafter described indicator or pointer which functions in cooperation with all of the strips, to designate the amount of time which a particular subject still has to run.

At the top of the time strips is a fourth strip designated 30 which sets forth in reverse order the time designations shown upon the total show length strip 22 and which is employed to indicate how much of the entire program is yet to be shown before the show starts over.

The numeral 31 designates an endless chain which extends lengthwise of the time strips, at the bottom of the group and which is supported at one end upon an idler sprocket gear 32 and at its other end is supported upon a motor driven sprocket gear 33. The idler gear 32 has connected therewith a hand crank 34 whereby the desired movement in one direction may be given to the endless chain when desired and for the purpose hereinafter described.

The driving gear for the endless chain 31 is operated by a synchronous motor 34 which operates through a gear reduction mechanism 35 to turn the gear 33 and move the endless chain in one direction at a desired speed and synchronously with the operation of the motion picture projectors.

Driving motion is transmitted to the main drive sprocket wheel or gear 33 through the medium of a friction plate clutch which is generally designated 36. One plate of this clutch, indicated at 37, is fastened to the main drive shaft 38 of the speed reduction gear mechanism while the other plate 39 of the clutch has the main drive sprocket wheel secured thereto as illustrated.

Secured to the outer end of the speed reduction gear mechanism shaft 38 is a lock collar or nut 40 and interposed between this collar and the main drive sprocket wheel 33 which is secured to or forms a part of the clutch plate 39, is a tension spring 41 which maintains the shiftable clutch plate 39 in frictional engagement with the plate 37 which is fixed to the shaft 38. This tension spring is so adjusted that the clutch cannot slip when the shaft 38 of the speed reduction gear mechanism is turning at the proper speed to operate or move the endless chain by which the hereinafter described indicator or pointer is moved from the starting of the show lengthwise of the time strips. However slippage is permitted between the clutch plates when reverse driving movement is imparted to the endless chain for returning the indicator to starting position as hereinafter set forth.

Extending lengthwise of the horizontally maintained top run of the endless chain is a guide 42 which may be of any suitable character but is here illustrated as being in the form of a slotted member. Engaged in this guide 42 is a runner 43 which carries a pointer hand or wand 44 which extends across the faces of the several parallel time strips. Thus this pointer when moved from the starting end of the show length indicating time strip 22 in the normal progressive movement of the endless chain, will designate on the strips the amount of time the entire show has been in operation, the amount of time a particular subject has been performing or in operation, the amount of time which the stated particular subject still has to run and the amount of time which the entire show still has to run.

The runner 43 is attached to a link of the endless chain whereby upon movement of the top run of the chain the runner will be shifted in or with respect to the guide 42.

Supported adjacent to and parallel with the pointer guide 42, for limited longitudinal reciprocatory motion, is a slotted trip bar 45, the ends of the bar being mounted in the supporting post 46. This trip bar 45 is formed in two adjustably connected sections which are coupled together in end over lapping relation whereby the effective length of the trip bar may be changed in accordance with the length of the show.

The bar may be in the form of a ribbon or a flat strip of material and is provided with the longitudinal slot 47 in which is slidably engaged the pin 48 which is carried by the pointer supporting runner 43.

At one end of the trip bar, here shown as the starting end for the pointer, there is provided a toggle switch 49, the arm 50 of which is loosely connected with the adjacent end of the trip bar whereby when the bar is shifted to the right, at the end of travel for the pointer, the switch will be closed to operate the pointer reset mechanism which is generally designated 51.

The pointer reset mechanism 51 when operated by the closing of the control switch 49 therefor, functions to reversely run the endless chain so as to return the pointer 44 to the beginning or starting position or to the position to indicate the start of the show. This reset mechanism comprises the motor 52, with the armature of which is connected the short tubular shaft 53. Connected with this shaft 53 are centrifugal weights 54 which are coupled with a sliding clutch body or boxing 55.

Rotatably supported adjacent the lower run of the endless pointer operating chain 31 is the sprocket gear 56 mounted upon the same shaft 57, with the bevel or miter gear 58.

In mesh with the gear 58 is a bevel gear pinion 59 which is carried upon the shaft 60 which shaft extends through the clutch box 55 and the centrifugal weight mechanism into the tubular end of the shaft 53. Secured within the clutch box 55 upon the miter gear shaft 60 is a clutch disc 61 which, when the centrifugal weights 54 are projected outwardly by centrifugal force, is engaged by the outer end of the clutch box so as to couple together the shafts 53 and 60 to effect the rotation of the endless chain reversing gear wheel 56.

The reset motor 52 is connected in circuit with the toggle switch 49 to the terminal posts 62 by the conductors 63.

Between the toggle switch 49 and the terminals 62 is the manual control switch 64 by means of which the circuit to the reset motor can be closed independently of the toggle switch 49 for the purpose of returning the pointer any desired distance over the time indicating strips, where such return movement of the pointer is found necessary or desirable.

The reset motor 52 is of the reversible type. It may thus be reversed to operate in the opposite direction from that in which it operates when it is energized through the toggle switch 49 or the manual control switch 64. To accomplish this there are provided wires 67 which go to a switch 69 located in the projection room and available to the projector operator to cause the time indicating or minute indicating hand to move forwardly to any desired predetermined position in the following manner.

When the switch 69 is set at contact 2, coil L2 of the motor 52 is energized causing motor to rotate counterclockwise and at the same time coil L1 is dead, because the contact 1 at switch 69 is open. This switch 69 is at all times set at contact 2 when automatic resetting of the mechanism is desired. It is also noted that the switch arm is engaged with contact 2 for manual resetting of the pointer 44 if it is desired to move this pointer or indicator from right to left by closing the switch 64.

When the switch 69 is thrown to contact 1, coil L1 is energized causing motor 52 to rotate in a clockwise direction by the closing of switch 64 and at the same time coil L2 is dead because contact 2 is open.

A reason for moving the minute indicating hand forwardly would be the running of the show late or behind time. This might occur where during the stage performance the audience might call for additional appearances of the performers so that the time allotted for the stage performance might be run for 59 minutes instead of 50 minutes as indicated upon the time strip 27. The show would thus be 9 minutes late and this time would be made up during the following show by omitting some portion of the show which, in the present case, might be the cartoon which is scheduled to run for 9 minutes. Accordingly at the termination of the feature designated by the time strip 24 the projector operator would close the circuit through the conductors 67 and advance the pointer across the cartoon time strip to the news reel strip thereby making up the time lost during the previous show.

It will be readily apparent from the foregoing that in the operation of the program schedule indicator the pointer will start at the beginning of the show simultaneously with the starting of the projector and since the operating motor 34 for the pointer and the projector motor are of the synchronous type the movement of the pointer will be in time with the showing of the picture. Consequently at the end of the time allotted for the feature picture, here indicated as 85 minutes, the pointer will be at the numeral 85 on the time strip 23 but will be at the mark 1 upon the overlying strip 23'. At any time during this travel of the pointer the indicator will show to a patron outside the theater how much of the show has already been shown, how much of the feature picture has been shown, how much of the feature picture remains to be shown and how much of the total time of the show remains to run.

At the start of the apparatus the toggle switch 49 will be open as well, of course, as the manual switch 64. When the pointer or minute indicating hand reaches the end of the news reel time strip, if the stage performance is not to be accompanied by music from the projector, continuation of the operation of the pointer operating motor 34 will be maintained by the closing of the auxiliary switch 68 whereby current will be carried across from the positive or hot line side of the supply circuit to the positive line of the circuit 17 which is connected to the motor 34 and also supplies current when required, to the reset motor. This auxiliary switch 68 would also be employed during the intermission period unless music is being furnished by the sound equipment.

When the pointer reaches the end of the intermission period the pin 48 carried by the pointer supporting runner will come to the end of the slot in the reset trip and will shift the trip bar to the right to effect the closing of the toggle switch 49. This closes the circuit through the reset motor which, through the operation of the centrifugal weights 54, will be automatically coupled with the gears 58 and 59 and the sprocket wheel 56 to cause the reverse running of the endless chain and the rapid movement of the pointer back to starting position.

When the pointer gets back to starting position it will engage the other end of the slot of the reset trip bar and actuate the toggle switch arm to switch open position.

During this reverse movement of the pointer the driving gear 33 will be reversely rotated, turning oppositely from the clutch plate 37 which is driven by the speed reduction gear mechanism. Since the clutch tension spring 41 is lightly set, as previously stated, the clutch will readily slip during this reverse movement of the pointer operating chain but as soon as the toggle switch 49 is opened so that the reset motor is stopped the clutch will take hold and the pointer will begin its forward movement under the action of the motor 34.

While the reset motor circuits are shown connected with the circuit supplying the motor 34 for driving the pointer forwardly this hook-up does not have to be employed. In fact it would be preferable in making an installation to have the reset motor operated on an entirely different circuit.

The main terminal strip 18 would be in the main projection room or in any other conveniently located place and from this strip would be run circuits leading to program schedule indicators located in different places about the theater.

The master indicator here illustrated would, as previously stated, be on top of the theater or some convenient location in front of the same such as upon the theater marquee where it could be conveniently seen by the public and might be any where from five feet to a hundred feet in length. The size would be immaterial except for the fact that the longer the indicator is made the farther apart the calibrations of the minute or time indicating strips could be placed and the more clearly the indicator could be read from a distance.

The duplicates of the master indicator located in the different positions in the theater as indicated by the legends adjacent to the main terminal strip would, of course, be on a small scale. In small theaters only the master indicator and a small one in the projection room might be required while in larger theaters a number of these small indicators would be employed. All of the indicators would, of course, be connected in parallel with the projector motor circuit and separately fused as indicated.

From the foregoing it will be readily apparent that the theater program schedule indicator herein disclosed will fill a long felt need in connection with theater operation as it will enable the public to see at a glance just what part of a show is being run and how much time that particular part still has to run as well as the length of the entire show and the amount of time of the entire show is still to be run off.

The operation of the indicator is entirely automatic and maintains proper sequence with the picture projectors, except where the auxiliary switch must be actuated manually during those short periods when the projectors may not be in operation. This does not, however, interfere with the proper timing movement of the pointer since the pointer will be automatically shifted back to starting position to be ready for service instantaneously with the starting of the picture projector.

I claim:

1. In a theater program schedule indicator, a linear time scale calibrated in fractions of the hour and showing the entire time length of the show, a plurality of linear scales calibrated in the same fractions of the hour as the first scale and each showing the time length of a feature of the show, the plurality of scales being consecutively arranged in parallel with the first scale and having the calibrations matched with the calibrations of the first scale, an endless flexible member, spaced rotary supporting means for the endless member, a portion of said member between the supporting means running parallel with the scales, a drive means for moving said endless member around the rotary supporting means, a friction clutch coupling the drive means with the endless member, a pointer carried by the said portion of the endless member and arranged to extend across the scales to simultaneously designate a time period upon at least two of the scales, the said drive means moving the endless element and the pointer in one direction only, and means for oppositely moving the endless member and the pointer in opposition to the clutch connection between the endless member and the drive means.

2. A theater program schedule indicator as set forth in claim 1 in which the said means for reversely moving the endless member and the pointer comprises an electric motor, a control switch for the motor, a means operating automatically upon the arrival of the pointer at one end of the show length indicating scale to close the switch to effect energization of the motor and for energizing the motor upon arrival of the pointer at the other end of the scale, and means for establishing a driving connection between said motor and the endless element following the energization of the motor.

3. An indicator mechanism of the character stated, comprising a linear scale, a pointer disposed in operative relation with the scale, means for moving the pointer longitudinally of the scale comprising an endless member extending lengthwise of the scale and a pair of rotary members each disposed adjacent an end of the scale and having the endless member extending therearound, the pointer being attached to one run of the endless member, a motor, a slip clutch connection between the motor and one of the rotary elements for imparting movement to said endless member, a second motor, and means for establishing a driving connection between the second motor and the endless element and to effect movement of the endless element in a direction opposite to the direction imparted thereto by the first motor, the second motor when operating overcoming the clutch connection between the endless element and the first motor.

4. In an indicator mechanism of the character stated, a linear scale, an endless flexible element extending lengthwise of the scale, rotatable supporting means for the endless element disposed at opposite ends of the scale, an electric motor, a slip clutch connection between said motor and one of the rotary supporting means, a pointer carried by one run of the endless element and positioned to move lengthwise of and over said scale, a second electric motor, a centrifugally actuated clutch means operated by the second motor for establishing a driving connection between the second motor and a run of the endless element, said second motor operating to drive the endless element in a direction opposite to that in which it is driven by the first motor, and said clutch between the first motor and the endless element being constructed and arranged to slip during the opposite direction of movement of the endless element by the second motor and while the first motor is continuing to operate.

5. An indicating mechanism of the character stated in claim 4, with a circuit controlling switch for the second motor, and means connected with the switch and constructed and arranged to be actuated by the pointer to effect the closing of the switch and the setting of the second motor into operation when the pointer has moved a predetermined distance with respect to the scale and for opening the switch to effect the stopping of the operation of the second motor when the pointer has been reversely moved by the second motor to a predetermined position with respect to the scale.

6. A theater program schedule indicator designed for operation in conjunction with an electric motor operated picture projector, comprising a linear time scale showing the length of a show in which the projector plays a part, an electric motor connected with the projector motor for synchronous operation therewith, an endless flexible element extending lengthwise of the linear scale, rotary supporting and driving members for the endless element disposed at opposite ends of the scale, a slip clutch connection between one rotary member and said motor, the endless element being driven in one direction by the first motor through the clutch by the operation of the motor, a pointer carried by one run of the endless element and disposed over the scale for movement lengthwise thereof, a reversible electric motor, means for establishing a driving connection between the reversible motor and the endless element when the reversible motor is energized, means for energizing the reversible motor for operation in a direction to move the endless element oppositely to the direction in which such element is moved by the first named motor, said slip clutch being designed to permit the opposite movement of the endless element while the first motor is continuing to operate, and means for effecting the operation of the reversible motor in the opposite direction while the first named motor is advancing the pointer to effect the accelerated advancement of the pointer to a predetermined extent, the reversible motor when operating in the said opposite direction, moving the endless element at a greater speed than the first motor.

7. The theater program schedule indicator as set forth in claim 6, wherein the said means for operating the reversible type motor in a direction to move the endless element reversely to the direction in which it is moved by the first motor, comprises a switch controlling the reversible motor circuit, and means forming a lost motion coupling between the pointer and the switch which is constructed and arranged to establish a positive connection between the pointer and the switch at the two extreme positions of movement of the pointer.

FRED A. ERHARD.

REFERENCES CITED

The following references are of record in the file of this patent:

UNITED STATES PATENTS

| Number | Name | Date |
|---|---|---|
| 1,304,010 | Bechtold | May 20, 1919 |
| 2,026,998 | Sanford et al. | Jan. 7, 1936 |
| 2,217,902 | Gross | Oct. 15, 1940 |
| 2,265,872 | Semel | Dec. 9, 1941 |
| 1,908,452 | Schlueter | May 9, 1933 |
| 2,177,102 | Glover | Oct. 24, 1939 |
| 2,201,941 | Behr | May 21, 1940 |
| 1,965,906 | Pettingell | July 10, 1934 |